United States Patent

Sengupta et al.

[11] Patent Number: 5,863,867
[45] Date of Patent: Jan. 26, 1999

[54] FINE-PARTICLE BI-SR-CA-CU-O HAVING HIGH PHASE PURITY MADE BY CHEMICAL PRECIPITATION AND LOW-PRESSURE CALCINATION METHOD

[75] Inventors: Suvankar Sengupta, Upper Arlington; Joey Michael Corpus, Gahanna, both of Ohio; Jai Subramanium, Spokane, Wash.

[73] Assignee: Superconductive Components, Inc., Columbus, Ohio

[21] Appl. No.: 738,673

[22] Filed: Oct. 28, 1996

[51] Int. Cl.[6] .............................. C01F 11/02; C01F 11/04
[52] U.S. Cl. ........................ 505/121; 423/593; 505/782
[58] Field of Search .................................. 505/121, 782; 423/593

[56] References Cited

U.S. PATENT DOCUMENTS

| | | |
|---|---|---|
| 4,839,339 | 6/1989 | Bunker et al. . |
| 5,071,829 | 12/1991 | Chiang et al. ........................... 505/782 |
| 5,086,034 | 2/1992 | Balachandran et al. . |
| 5,147,848 | 9/1992 | Chang et al. ........................... 505/782 |
| 5,484,766 | 1/1996 | Shah et al. ........................... 505/782 |
| 5,716,909 | 2/1998 | Majewski et al. ........................... 505/782 |

FOREIGN PATENT DOCUMENTS 224225  9/1989  Japan ..................................... 505/782

OTHER PUBLICATIONS

Akira Ono, "Synthesis of the 107 K Superconducting phase in the Bi–Sr–Ca–Cu–O System", *Japanese Journal of Applied Physics*, vol. 27, No. 7 (Jul., 1988), pp. L1213–L1215.

Naoki Uno et al, "Synthesis of Bi–Sr–Ca–Cu–O Superconductor by Vacuum Calcination Method," *Japanese Journal of Applied Physics*, vol. 27, No. 6 (Jun., 1988), pp. L1013–L1014.

R. Escudero et al, "Isolation of the 110K Superconducting phase of Bi–Pb–Sr–Ca–Cu–O compounds," Appl. Phys. Lett. 54 (16), 17 Apr. 1989, pp. 1576–1578.

*Primary Examiner*—Wayne Langel
*Attorney, Agent, or Firm*—Hudak & Shunk Co., L. P. A.

[57] ABSTRACT

In accordance with the invention a process is provided for achieving a phase-pure BSCCO or lead doped BSCCO powder or precursor of the 2201, 2212 or 2223 phase. In this process a cation solution is intimately mixed with an anion solution and precipitation is caused at a carefully controlled pH in the range from about 10 to about 12.5. The resulting product is filtered and dried or heat-treated at a temperature of from about 400° to about 500° C. for a period of from about 8 to about 12 hours. The heat-treated powder is then subjected to a second heat treatment at a reduced oxygen of from about 3 to about 10 torr and a temperature of from about 700° to about 800° to form a precursor powder. The precursor powder is heat-treated at ambient pressure in $CO_2$-free air from about 12 to about 31 hours or more at a temperature of from about 800° to about 850° C. A product results having a particle size of less than 5 microns, low carbon content and a phase purity of at least about 95 percent.

12 Claims, 8 Drawing Sheets

FINE-PARTICLE BI-SR-CA-CU-O HAVING HIGH PHASE PURITY MADE BY CHEMICAL PRECIPITATION AND LOW-PRESSURE CALCINATION METHOD

FIELD OF THE INVENTION

This invention relates to Bi—Sr—Ca—Cu—O ("BSCCO") powders in the form of 2201, 2212 and 2223 phases and to the partial substitution of Bi by Pb in order to stabilize the 2223 phase, and more particularly to a high phase pure BSCCO powder (2201, 2212, and 2223 phase) and a highly reactive precursor powder that forms 2223 phase with subsequent heat treatment with particle size of the order of a micron or less with low carbon content. The invention also relates to a method of producing the powders utilizing chemical precipitation of a precipitate, which is collected, filtered, dried, and subsequently heat-treated in a controlled atmosphere. The controlled atmosphere can include air or low-pressure oxygen in pure oxygen atmosphere and low partial pressure of oxygen in an oxygen/nitrogen or oxygen/argon atmosphere.

BACKGROUND OF THE INVENTION

One of the major applications of a superconductor is in development of nearly resistanceless wires/tapes that can be used for transmission cables, magnets for MRI, energy storage devices (SMES, micro SMES), current leads and fault current limiters. Current successful approaches such as the powder-in tube (PIT) method for the HTS conductor fabrication techniques relies on the mechanical deformation and successive heat treatments. In PIT tapes and wires, high current-carrying capability is only achieved in thin wires/tapes. However, thin wires/tapes are mechanically weak and difficult to manufacture in long lengths. In order to circumvent this problem, wires/tapes are fabricated in multi-filamentary form. Since these processes rely on drawing, swaging, and rolling, it is important that the powders have fine particle size in order that the powder be well distributed throughout the wire during deformation. Furthermore, 2223 tapes/wires are fabricated from precursor powders which are transformed into 2223 with successive heat treatments and mechanical deformation. In these precursor powders, it is not only important that the powders have fine particle sizes, but also that they be homogeneously mixed and strongly reactive which can be achieved in accordance with this invention. Furthermore, the presence of carbon higher than 200 or 300 ppm is undesirable in tape fabrication processes as it forms bubbles thereby reducing the performance of the tape/wire due to formation of gaseous carbon dioxide.

Further many ceramic materials contain several different oxide constituents in which various ceramic phases are produced by solid-state reactions between constituent oxides during high-temperature sintering. In the event that the individual oxide particles are large and the solid-state reactions are slow, compositional inhomogeneity can result. This results in unwanted phases and chemical gradients within the material which can degrade the desired property. Such problems can be addressed by the use of the highest possible phase precursor powder as well as the use of fine-scale powder particles.

SUMMARY OF THE INVENTION

This invention relates to a method of preparing improved ceramic superconducting materials having a fine particle size and a high-phase purity. The invention also relates to a product which results from the process and in particular to a BSCCO product having a high-phase purity (i.e., more than 95 percent phase pure of 2201 phase, 2212 phase or 2223 phase) and a number average fine particle size (i.e., up to 5 microns, preferably less than 2 microns, and most preferably about 1 micron in size) and also to precursor powder that rapidly forms 2223 with heat treatments.

Currently ceramic superconductors are prepared by solid state reaction of oxides, carbonates, or nitrates. Generally a solid state reaction has been utilized to synthesize BSCCO powders. Typically in such reaction methods, $Bi_2O_3$, $SrCO_3$, $CaCO_3$ are mixed to desired stoichiometry, that is, for example if 2212 phase is desired, the initial components are added in a ratio of 2 parts of bismuth, 2 parts strontium, 1 part calcium, and 2 parts of copper. Similarly, the ratios of 2223 and 2201 are expressed as the ratios of bismuth to strontium to calcium to copper. The particle size of the precursor powder is generally in the range of 1–5 microns in order to achieve a fast reaction rate. Currently, precursors are mixed by standard solid state mixing procedures which lead to local composition inhomogeneities due to inadequate mixing. Additional grinding, mixing, and heat-treatment steps are therefore required to achieve phase pure BSCCO powder.

It is an object of the present invention to achieve a high-phase pure, fine-particle BSCCO powder with low carbon content. It is also an object of this invention to achieve a 2223 precursor powder that rapidly forms 2223 phase during heat treatments. A further object of the process is achieving an economically efficient process which eliminates the need for additional regrinding which can lead to unnecessary processing steps as well as sample contamination.

It is a further object of the invention to provide an improved method for preparing superconductive powders.

DESCRIPTION OF PREFERRED EMBODIMENTS

High-phase pure, high-temperature, superconductive powders such as BSCCO can be prepared by forming a metal cation solution by dissolving the metal oxide powders in acid in the proper molar ratio and subjecting the acidic solution to an anion solution which is used as a precipitate and for pH adjustment.

Figure 1:
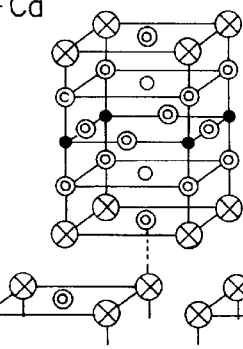
FIG. 1 is an illustration of the crystal structure for Bi—Sr—Ca—Cu—O system 2201, 2212, and 2223.
Figure 1:
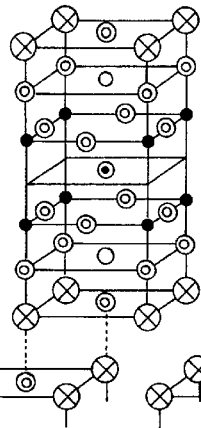
Figure 1:
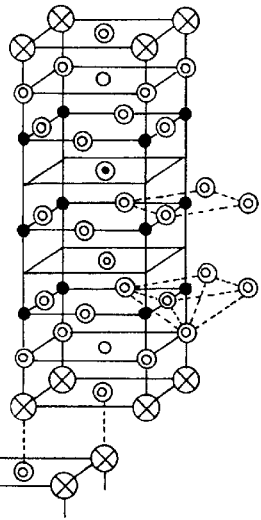
Figure 2:
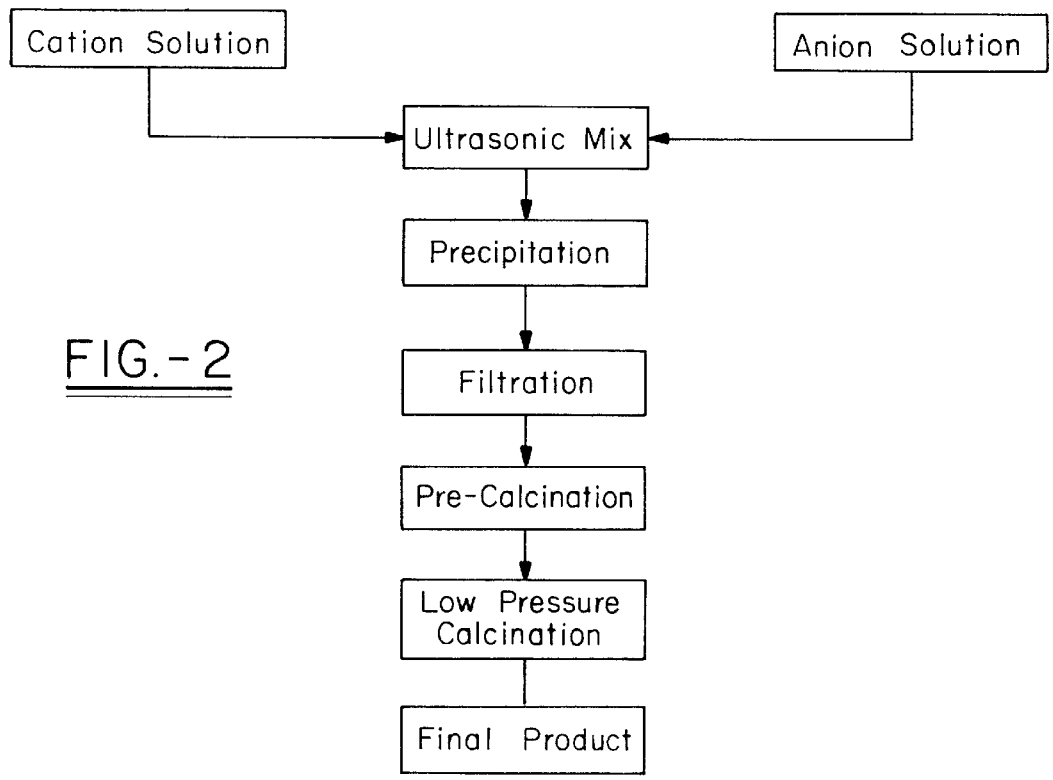
FIG. 2 is a flow chart for the process in accordance with the invention.
Figure 3:
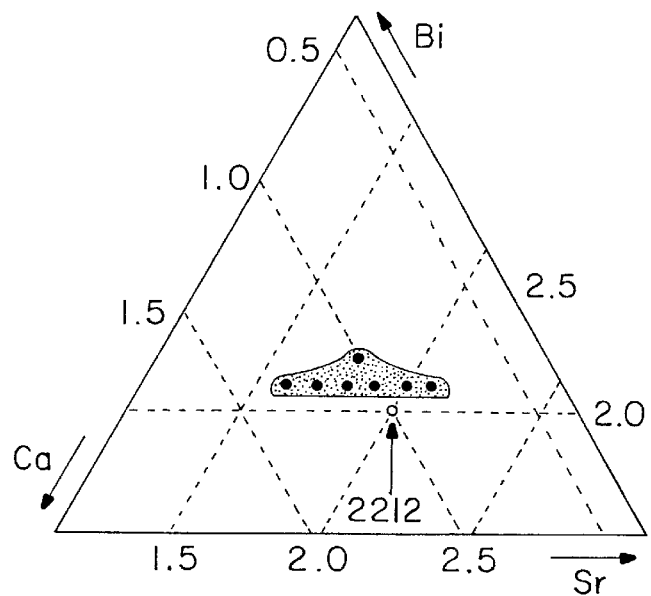
FIG. 3 is a phase diagram for the 2212 phase.
Figure 4:
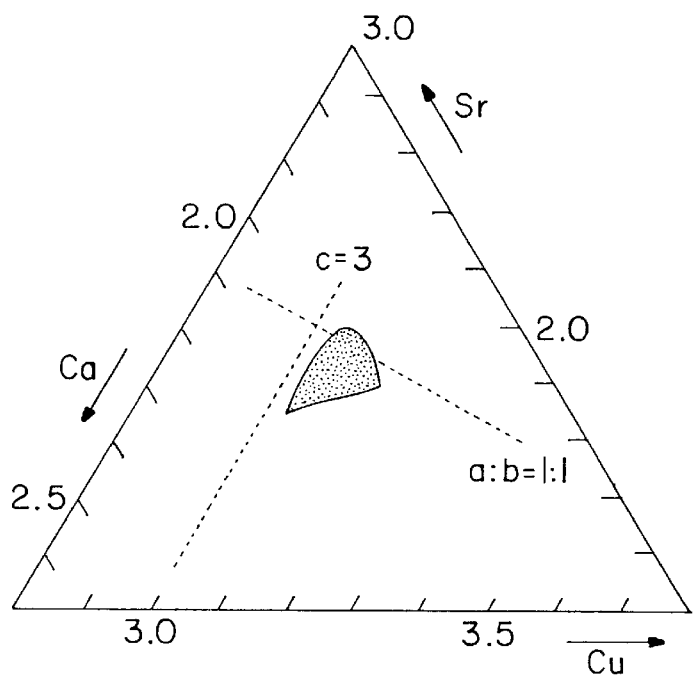
FIG. 4 is a phase diagram for the 2223 phase system.

The process of the present invention is applicable to produce precursor powders as well as single phase powders which would specifically include 2201, 2212 and 2223 phase (Bi—Sr—Ca—Cu—O). FIG. 1 illustrates the crystal structure for 2201, 2212, and 2223. A wide range of mutual substitution can occur, for example, Ca for Sr, Bi for Sr, and Ca. The phase diagram of FIG. 3 illustrates the specific compositions (holding the cupric oxide constant) for 2212 phase while FIG. 4 is a phase diagram for 2223 phase. The term 2223 phase as used herein is intended to cover both Bi—Sr—Ca—Cu—O and Bi—Pb—Sr—Ca—Cu—O in the 2223 phase. Other materials which can be made using the current process include $YBa_2Cu_3O_x$, and $YBa_2Cu_4O_z$ (124), where x is about 6–6.98 and z=7.5–8.

It is essential to the process of the present invention that the acidic cation metal solution (pH 0–5, preferably 0.5) and the basic hydroxy carbonate solution (pH 13.5–14) are intimately mixed with careful control of the system's pH during the precipitation phase of the process. In particular, pH gradients should be eliminated quickly and a desired homogeneous pH reached so that precipitation occurs and the product stream containing the precipitate leaves the chamber. The pH during the precipitation phase should preferably be from about 10 to about 12.5, more preferably from about 11 to 12, and most preferably from about 11.3 to 11.5. A precursor powder is isolated from the solution by filtration which precipitate is subsequently dried and heat-treated in a pre-calcination step. The precursor precipitate is subsequently calcined in a low-pressure oxygen atmosphere and then subsequently heat-treated at ambient pressure in $CO_2$-free air at an elevated temperature.

The process comprises controlled precipitation of insoluble salts by mixing two or more solutions, each of which contains highly soluble ionic components. For example, solution A may contain highly soluble salts of metal which are mixed with solution B containing highly soluble salts of precipitating anions such as hydroxide and carbonate. The individual powder particles then should contain a homogeneous mixture of the metal cations provided that several processing parameters are carefully controlled during the precipitation process.

The pH must be carefully controlled to ensure simultaneous and complete precipitation of all reagents. Secondly, the solutions must be instantaneously and completely mixed. Therefore, special mixing equipment is preferred such as an ultrasonic mixing horn.

In a subsequent processing step, the BSCCO precipitate is subjected to a calcination step in a low-pressure oxygen atmosphere. Specifically, the precipitate is first heat-treated at a temperature from about 400° C. to about 600° C. (at ambient pressure), preferably from about 450° C. to about 550° C., for a time of about 8–12 hours to form a heat-treated powder. The heat-treated powder is then subjected to a second heat-treatment step at a reduced pressure at an oxygen of from about 3 to about 10, preferably from about 3 to about 5 hours, and a temperature of from about 700° C. to about 800° C., preferably from about 725° C. to about 775° C., for from about 4 to about 10 hours, and a third heat-treatment step at ambient pressure in $CO_2$-free air for from about 12 to about 80 hours at a temperature of from about 800° C. to about 850° C. to produce the final product which can be a precursor powder or single phase.

EXPERIMENTAL METHODS

Example 1

2212 powder was made in accordance with the following method. The stoichiometry is set forth in Table 1.

$Bi_2O_3$, $CaCO_3$, and $SrCO_3$ was dissolved in concentrated $HNO_3$ and mixed with $Cu(NO_3)_2$ in proper molar ratio with constant stirring. The amount of Cu in $Cu(NO_3)_2$ was determined by conventional gravimetric methods. A mixture of alkyl ammonium hydroxide and alkyl ammonium carbonate, e.g., tetramethyl ammonium hydroxide and tetraethyl ammonium carbonate respectively (anion solution) was used as precipitant and for pH adjustment. Alternatively, tetraethyl ammonium hydroxide and tetraethyl ammonium carbonate can be used. The anion solution was prepared by bubbling $CO_2$ gas through a solution of tetramethyl ammonium hydroxide or mixing tetramethyl ammonium carbonate until the desired carbonate and solution pH was reached. Alternatively, the anion solution can also be prepared by bubbling $CO_2$ gas through a solution of tetraethyl ammonium hydroxide or mixing tetraethyl ammonium carbonate.

The acidic cation metal solution and the basic hydroxy carbonate solution was delivered by using peristaltic pumps and then mixed using an ultrasonic horn to provide a turbulent mixing environment. Within the chamber, concentration and pH gradients were eliminated in less than a millisecond, the desired pH was reached, precipitation occurred, and the product stream containing the precipitate left the chamber. Instantaneous mixing of the cation metal solution and the hydroxycarbonate solution was required in order to eliminate possible sequential precipitation which would cause phase segregation. The powder was then isolated form the solution by filtration.

The precipitate was dried and heat-treated at ambient pressure in air at 500° C. for 6 hours. The heat-treated powder which was brown in color contains a homogeneous mixture of oxides and carbonates of Bi, Sr, Ca, and Cu for 2201, 2212 and 2223 phases and Bi, Pb, Sr, Ca and Cu for Pb doped 2223 phase. The precursor powder was calcined in a low-pressure oxygen atmosphere. Specifically, the powders were first heat-treated at a reduced partial pressure of about 3 torr of oxygen at 750° C. for 6 hours and then at ambient pressure in $CO_2$-free air for 24 hours at about 850° C. Heat treatment at low pressure of $O_2$ not only reduced the carbon content of the powder, but also significantly increased the rate of the reaction.

Powder X-ray diffraction data were obtained using a Scintag PAD5 powder diffractometer with CuKα line. A JEOL JSM-820 Scanning Electron Microscope (SEM), operating at 25 kV accelerating voltage, was used to study the size and morphology of the Bi—Sr—Ca—Cu—O particle. The samples were prepared by sprinkling some powder onto aluminum stubs that were covered with double-sided tape. A gold layer was then deposited by standard sputtering techniques.

Example 2

Example lead doped 2212 powder was made as described for Example 1 except that lead oxide was added with the bismuth oxide, calcium, carbonate and strontium carbonate. Alternatively lead nitrate can be added instead of lead oxide.

Example 3

2223 precursor powder was made in accordance with the method of example 1 except that the stoichiometry of the cation solution was varied according to Table 1.

TABLE I

|  | Bi | Pb | Sr | Ca | Cu |
|---|---|---|---|---|---|
| Target Composition | 1.8 | 0.4 | 2 | 2 | 3 |
| Composition as observed by ICP | 1.8 | 0.396 | 1.951 | 1.957 | 3.06 |

RESULTS AND DISCUSSION

The as-precipitated powder was in the hydroxide and carbonate form. After heating at 500° C. for 6 hours, the powder was the mixture of $Bi_2O_3$, CuO, $CaCO_3$, and $SrCO_3$ based on the powder XRD result. However, the components are intimately mixed and therefore very reactive.

Figure 5A:
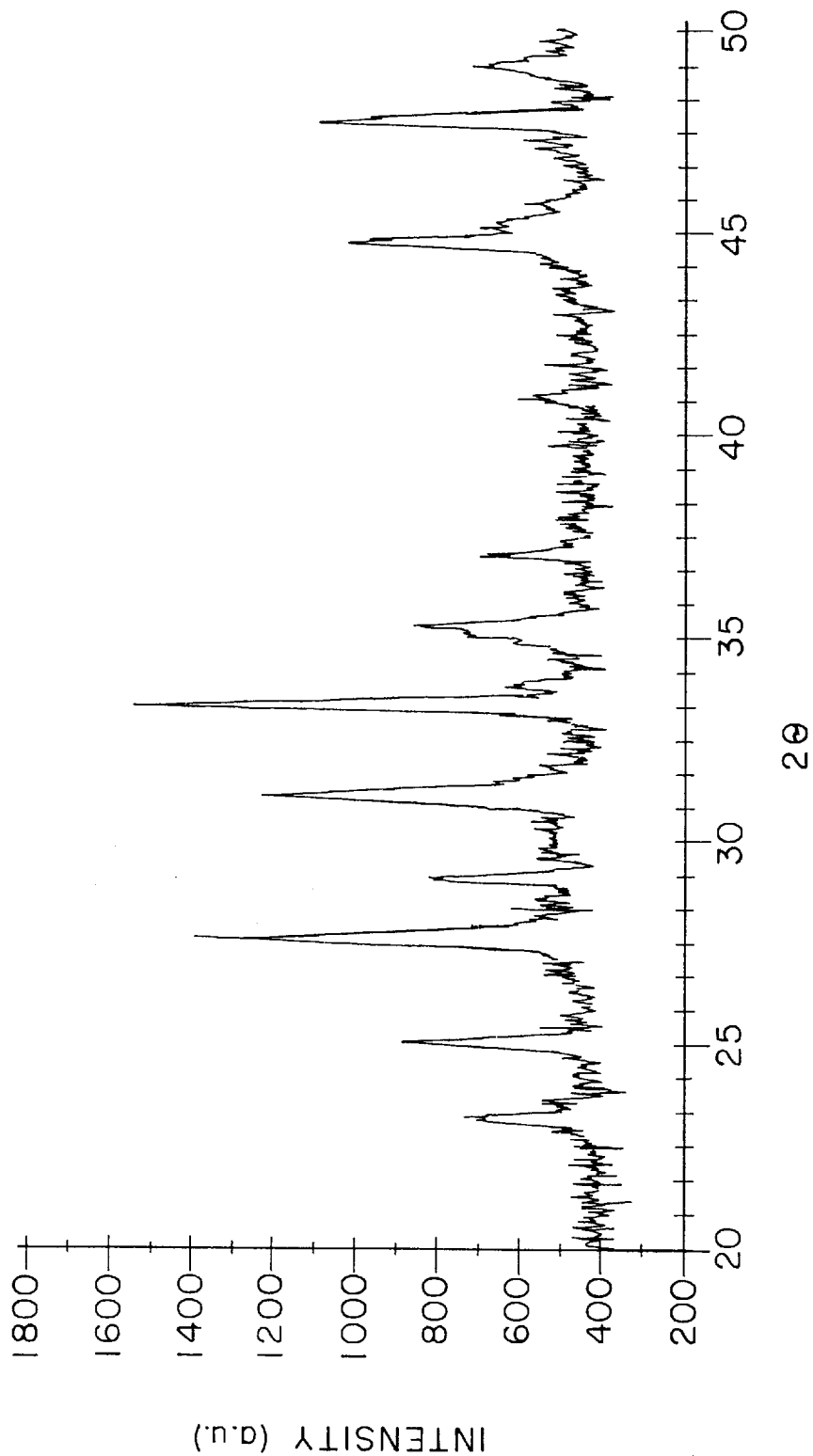
FIGS. 5a and 5b are X-ray diffraction pattern and particle size analysis diagrams for the 2212 phase.
Figure 5B:
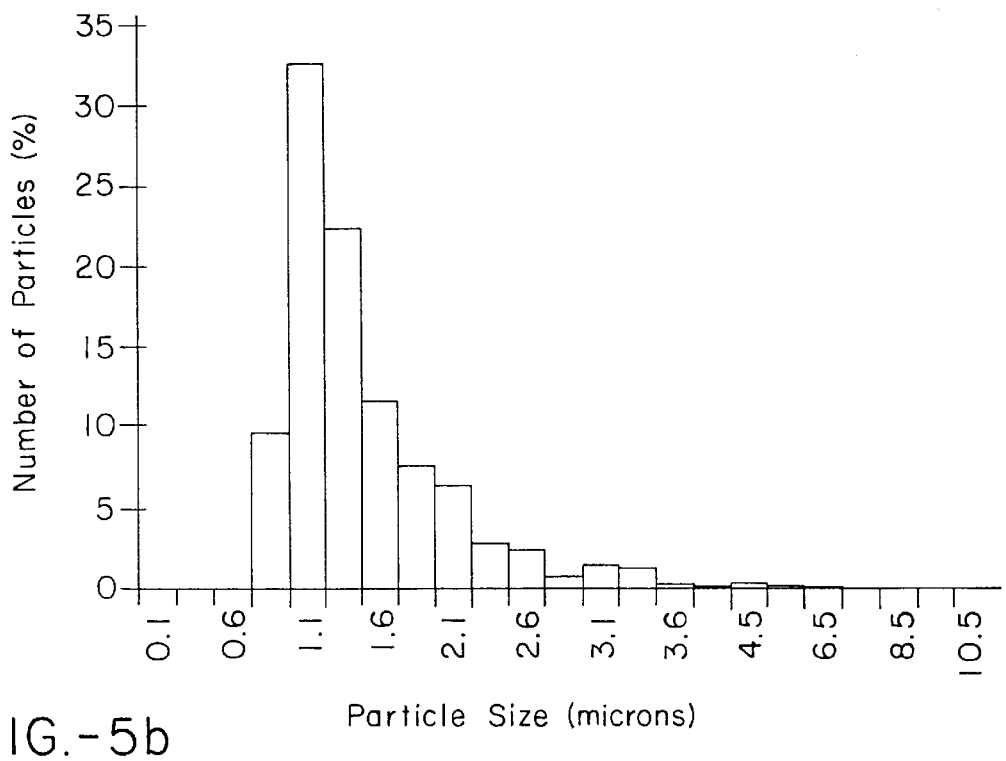
Figure 8:
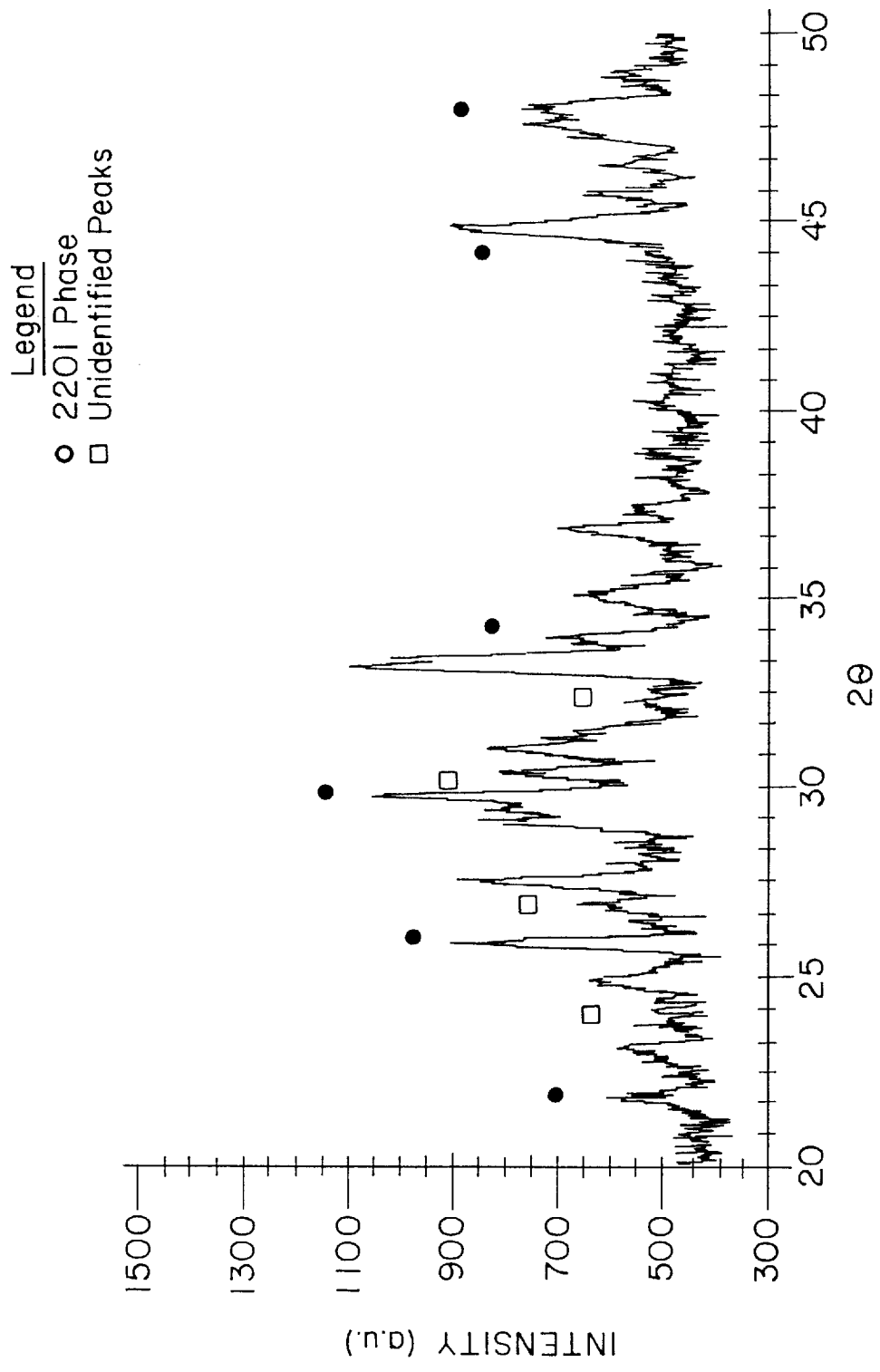
FIG. 8 is an X-ray diffraction pattern for 2212 impure phase sample prepared by solid-state methods.

FIGS. 5a and 5b show the XRD pattern and particle size analysis of $Bi_2Sr_2CaCu_2O_x$ 2212 powder prepared by chemical precipitation and solid-state methods respectively. Equivalent heat treatment schedules were followed for both the chemical precipitation as well as the solid-state powder. As evident, the powder prepared by the precipitation route is phase pure. However, the powder prepared by solid-state grinding and ball milling shows evidence of $Bi_2Sr_2CuO_x$ and other secondary phases. This is illustrated by FIG. 8 which is an X-ray diffraction pattern diagram for Bi-2212 using solid-state technology. The lack of phase purity is illustrated by the 2201 phase and other unidentified peaks. In order to achieve phase pure $Bi_2Sr_2CaCu_2O_x$ using the solid-state method, the calcined powders had to be further ground, mixed, and heat-treated. The results thus clearly demonstrate the advantage of synthesizing Bi—Sr—Ca—Cu—OP precursor by utilizing co-precipitation as opposed to conventional solid-state mixing.

Figure 6B:
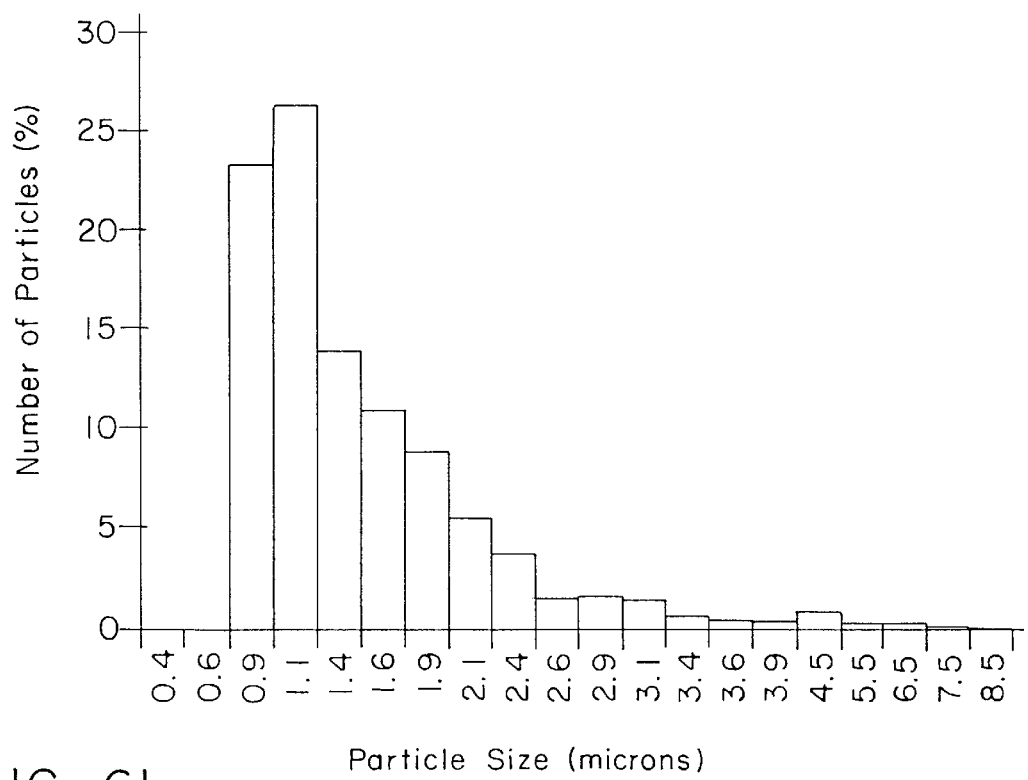
FIGS. 6a and 6b are X-ray diffraction pattern and particle size analysis diagrams for the 2223 precursor phase.
Figure 6A:
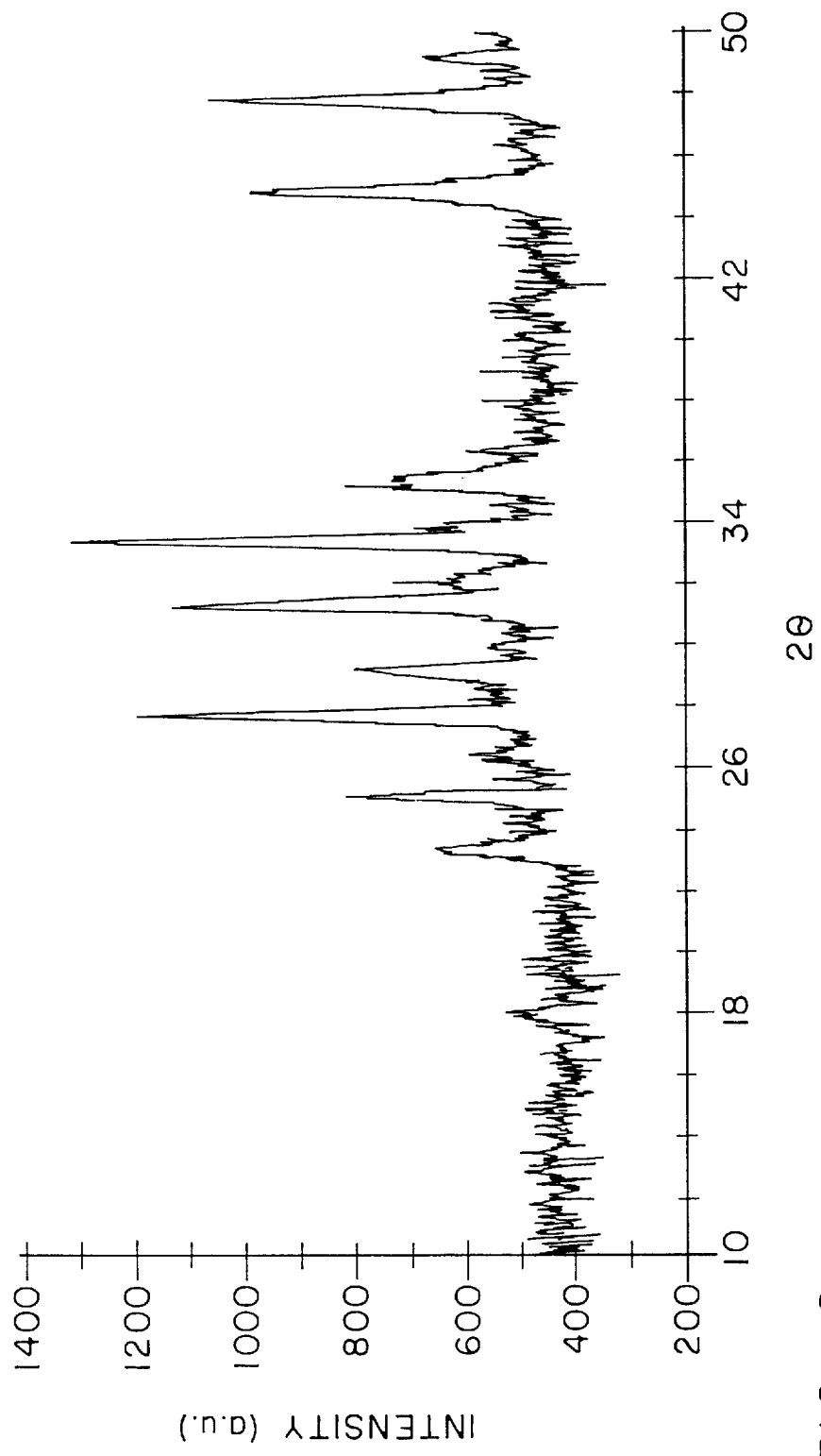
Figure 7A:
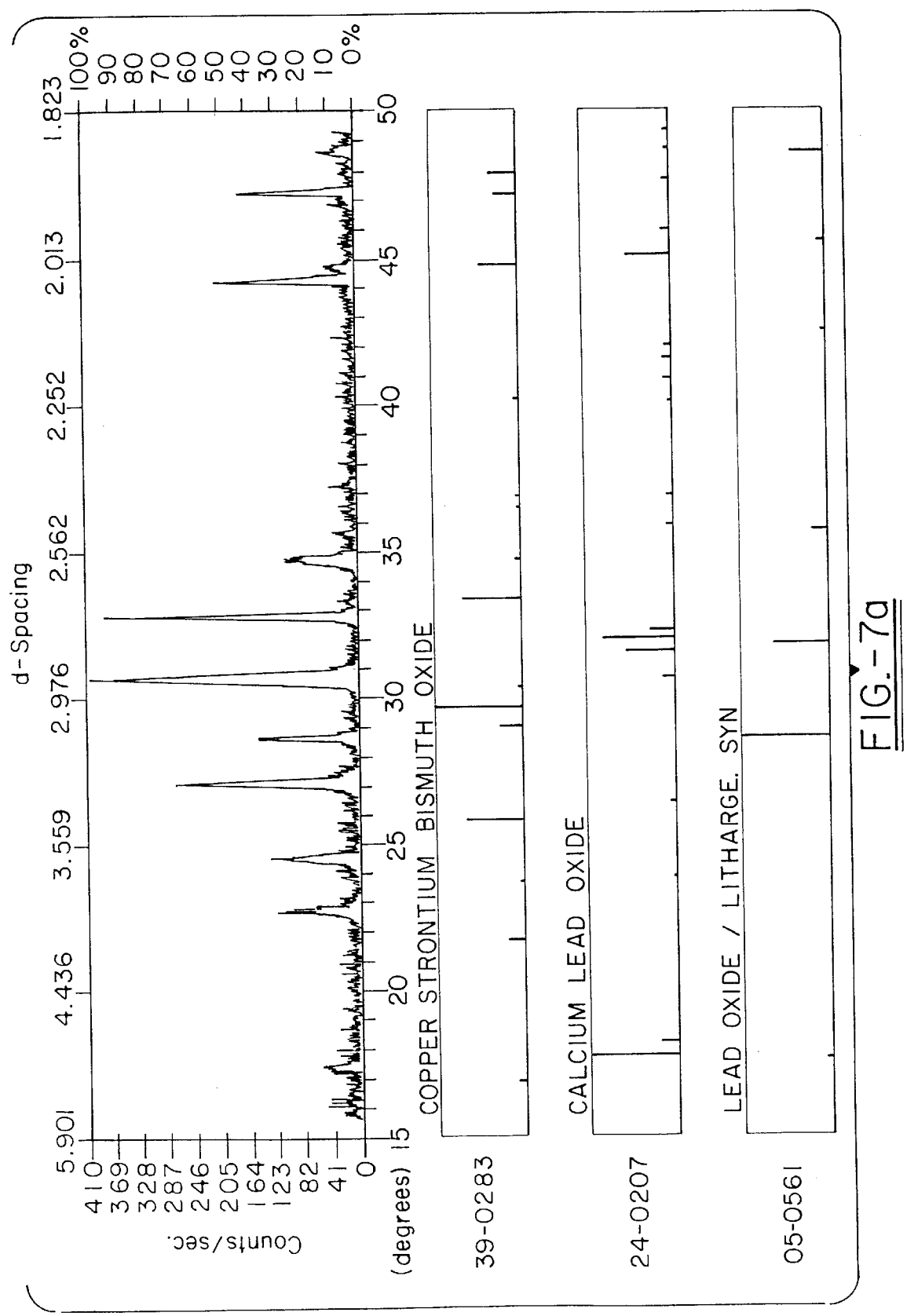
FIGS. 7a and 7b are X-ray diffraction pattern and particle size analysis diagrams for the lead-doped 2212 phase.
Figure 7B:
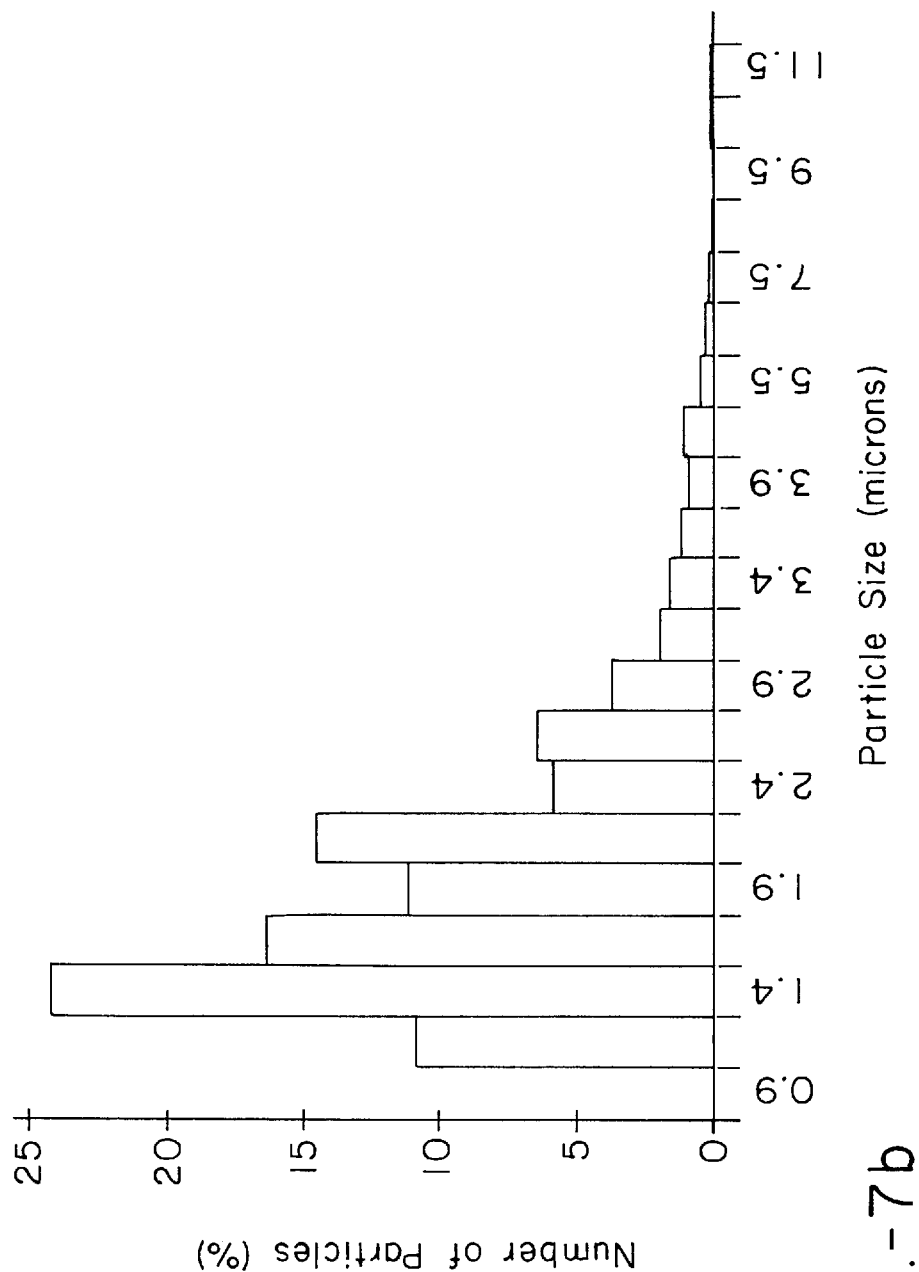

FIGS. 6a and 6b similarly show X-ray fraction and particle size analysis for 2223 precursor, and FIGS. 7a and 7b show X-ray diffraction pattern and particle size analysis for lead-doped 2212.

CONCLUSIONS

A phase pure $Bi_2Sr_2CaCu_2O_x$ powder has been obtained using a chemical precipitation method. Particle sizes less than 1 micron were observed in these powders. The high reactivity of the precursor powder was apparently associated with the better mixing obtained by the chemical method in comparison to the standard solid-state method.

While in accordance with the patent statutes the best mode and preferred embodiment has been set forth, the scope of the invention is not limited thereto, but rather by the scope of the attached claims.

What is claimed is:

1. A method for making BiSrCaCuO powder comprising the steps of:

dissolving $Bi_2O_3$, $CaCO_3$ and SrCO in concentrated $HNO_3$ and adding $Cu(NO_3)_2$ to the acidic cation solution or mixing $Bi(NO_3)_2$, $Ca(NO_3)_2$, $Sr(NO_3)_2$ and $Cu(NO_3)_2$ and optionally PbO or Pb to form an acidic metal cation solution;

mixing the solution with a basic anion solution of alkyl ammonium hydroxide and alkyl ammonium carbonate to form a precipitate;

filtering and drying the precipitate;

subjecting the precipitate to a reduced partial pressure of from about 2 to 10 torr and a temperature of at least about 750° C. for a time sufficient to cause calcination and then to ambient pressure in $CO_2$-free air at at least about 825° C. for a time sufficient to form a BiSrCaCuO powder which is at least 75% phase pure.

2. A method as set forth in claim 1, wherein said mixing is conducted ultrasonically.

3. A method as set forth in claim 2, wherein the $Cu(NO_3)_2$ is added to the acidic solution to achieve a pH of from about 10 to about 12.5.

4. A method as set forth in claim 3, wherein said acidic cation solution and said basic hydroxy anion solution are delivered using peristaltic pumps and are mixed using an ultrasonic horn.

5. A method as recited in claim 4, wherein during said drying step, said precipitate was dried and heat-treated at 500° C. for six hours.

6. A method of making a product comprising; 2201, 2212 or 2223 phase powder or a precursor thereof, comprising a the steps of forming an acidic cationic solution of ions of bismuth, strontium, calcium, copper and optionally lead;

intimately mixing said cationic solution with alkyl ammonium hydroxide carbonate solution and controlling the pH of said mixture to between about 10 and 12.5 to form a precipitate of said product; filtering and drying said precipitate; and subjecting said precipitate to a reduced partial pressure of from about 3 to about 10 torr and a temperature of at least about 750° C. for a time sufficient to cause calcination.

7. A method as set forth in claim 6, wherein said product is subjected to heat at ambient pressure $CO_2$-free air to result in a product which is substantially a single-phase product.

8. A method as set forth in claim 7, wherein the single phase product is 2212 phase.

9. A method as set forth in claim 8, wherein the single phase product is 2223 phase or a precursor thereof.

10. A method as set forth in claim 6, wherein said acidic cationic solution is formed by dissolving $Bi_2O_3$, CaO, and SrO in concentrated $HNO_3$ and adding CuO.

11. A method as set forth in claim 6, wherein said pH is maintained at a range of from about 11.0 to about 11.5.

12. A method as set forth in claim 6, wherein said alkyl ammonium hydroxide solution comprises tetramethyl ammonium hydroxide or tetraethyl ammonium hydroxide.

* * * * *